(12) United States Patent
Hamilton et al.

(10) Patent No.: US 8,463,638 B2
(45) Date of Patent: Jun. 11, 2013

(54) SYSTEMS AND METHODS FOR AUTOMATIC SCHEDULING OF A WORKFORCE

(75) Inventors: Edward Hamilton, San Jose, CA (US);
Jason Fama, Redwood City, CA (US);
Mike Bourke, San Francisco, CA (US)

(73) Assignee: Verint Americas Inc., Melville, NY (US)

( * ) Notice: Subject to any disclaimer, the term of this patent is extended or adjusted under 35 U.S.C. 154(b) by 0 days.

(21) Appl. No.: 12/686,213

(22) Filed: Jan. 12, 2010

(65) Prior Publication Data

US 2010/0114645 A1 May 6, 2010

Related U.S. Application Data

(63) Continuation of application No. 11/396,063, filed on Mar. 31, 2006, now Pat. No. 7,672,746.

(51) Int. Cl.
*G06Q 10/00* (2012.01)
(52) U.S. Cl.
USPC .................. 705/7.16; 705/7.13; 705/7.22
(58) Field of Classification Search
USPC ................. 705/8, 9, 7.13, 7.16, 7.22
See application file for complete search history.

(56) References Cited

U.S. PATENT DOCUMENTS

| | | | |
|---|---|---|---|
| 5,325,292 A | 6/1994 | Crockett | |
| 5,911,134 A | 6/1999 | Castonguay et al. | |
| 6,044,355 A | 3/2000 | Crockett et al. | |
| 6,628,777 B1 | 9/2003 | McIllwaine et al. | |
| 6,970,829 B1 | 11/2005 | Leamon | |
| 7,650,293 B2 * | 1/2010 | Kiran et al. | 705/7.25 |
| 2002/0040313 A1 * | 4/2002 | Hunter et al. | 705/9 |
| 2004/0267591 A1 | 12/2004 | Hedlund et al. | |
| 2005/0004828 A1 * | 1/2005 | deSilva et al. | 705/9 |
| 2005/0137925 A1 * | 6/2005 | Lakritz et al. | 705/8 |
| 2006/0239440 A1 | 10/2006 | Shaffer et al. | |
| 2007/0127690 A1 | 6/2007 | Patakula et al. | |
| 2007/0179829 A1 * | 8/2007 | Laperi et al. | 705/9 |
| 2010/0312605 A1 * | 12/2010 | Mitchell et al. | 705/9 |

OTHER PUBLICATIONS

Production scheduling or what's next? (Computer-assisted Manufacturing Planning and Control for Job Shops, part 6) Diesslin, Rich; O'Connor, Fran Modern Machine Shop , v62 , n10 , p. 94(11) Mar. 1990 ISSN: 0026-8003.*
IEX Web TotalView Overview download from the Dec. 4, 2003, IEX website via web.archive.org on Nov. 3, 2009.
TotalView WebStation Guide, Release 3.7, Document No. 1 602-660, Jun. 2004, IEX Corporation Jun. 2004.

(Continued)

*Primary Examiner* — William Rankins
(74) *Attorney, Agent, or Firm* — Andrus, Sceales, Starke & Sawall, LLP

(57) ABSTRACT

Systems and methods are disclosed for scheduling overtime and time-off for a workforce. In one embodiment, a method of workforce scheduling to handle an expected workload comprises, in an instruction execution system, receiving a first workforce schedule describing existing assignments of a plurality of workers to a plurality of shifts, each of the shifts being associated with a time range and a day; in response to a variance in the expected workload, selecting a modification to the first workforce schedule required to handle the variance in the expected workload during the day; and producing a second workforce schedule that modifies the length of at least one of the plurality of shifts to accommodate the modification to the first workforce schedule.

20 Claims, 11 Drawing Sheets

OTHER PUBLICATIONS

Quiggins et al., "A New approach to Contact Center Optimization," IEX Corporation, Jun. 21, 2004.

Koole, Ger et al., "Queueing Models of Call Centers: An Introduction," Annals of Operations Research, vol. 113, pp. 41-59, Jul. 2002 ISSN 0254-5330 (Print) 1572-9338 (Online).

Gans et al. "Telephone Call Centers: Tutorial, Review and Research Prospects," Manufacturing & Service Operations Management, vol. 5, No. 2, spring, 2003, pp. 79-141, 1523-4614/03/0502/0079, 1526-5498 electronic ISSN.

Communitywfm.com Symon's "Community" software website Aug. 2003, downloaded from web.archive.org.

Klungle, Roger, "Simulation of a Claims Call Center: A Success and a Failure," Proceedings of the 1999 Winter Simulation Conference, vol. 2, pp. 1648-1653, Dec. 5-8, 1999, ISBN: 0-7803-5780-9.

* cited by examiner

VTO Template 2200

| Activity: | TimeOff |
|---|---|
| Duration | |
| Action | Truncate |
| Placement: | BeginningOfShift/ EndOfShift/ Either |

FIG. 3B

OT Template 2200

| Activity: | Phone/ Email/ Fax |
|---|---|
| Duration | |
| Action | Extend |
| Placement: | BeginningOfShift/ EndOfShift/ Either |
| Gap | |

FIG. 3A

SYSTEMS AND METHODS FOR AUTOMATIC SCHEDULING OF A WORKFORCE

RELATED APPLICATIONS

This application is a continuation of and claims priority to U.S. application Ser. No. 11/396,063, entitled "Systems and Methods for Automatic Scheduling of a Workforce", filed on Mar. 31, 2006, now U.S. Pat. No. 7,672,746 which is hereby incorporated by reference in its entirety.

FIELD OF THE DISCLOSURE

The present disclosure relates to contact centers, and more specifically, to automatic scheduling of a workforce.

BACKGROUND

A manager in a contact center (also known as a call center) typically uses workforce scheduling software to create a schedule which assigns workers (agents) to shifts throughout the workday. The scheduler chooses an optimal schedule that meets constraints while optimizing goals. Inputs such as predicted workload (e.g., call volume in 15-minute intervals, average call duration) and work rules (e.g., maximum shift length, possible shift start time, break requirements) are treated as constraints. Inputs such as expected level of service (e.g., call hold time) are treated as goals. The scheduler generates many possible schedules, and examines the possibilities to find a schedule that optimizes goals while remaining within the constraint boundaries.

In general, existing workforce schedulers accurately schedule an appropriate number of agents to handle the expected workload during each time interval. It is common, however, for workload and/or agent availability to vary from predicted values once a workday has begun. To keep the contact center running at peak performance, the schedule should then be adjusted, by giving some agents overtime or giving some agents time off. Existing schedulers do not support automatically scheduling of overtime or time-off after a schedule has been created and the day has started. Therefore, a contact center manager typically responds by manually creating overtime or time-off events, through which a particular shift for a particular agent is extended or truncated. The process by which a manager manually determines which agents should be assigned overtime or time-off, and where the overtime or time-off should be placed on a schedule, can be time-consuming, tedious, and difficult.

OVERVIEW

Systems and methods are disclosed for scheduling overtime and time-off for a workforce. In one embodiment, a method of workforce scheduling to handle an expected workload comprises, in an instruction execution system, receiving a first workforce schedule describing existing assignments of a plurality of workers to a plurality of shifts, each of the shifts being associated with a time range and a day; in response to a variance in the expected workload, selecting a modification to the first workforce schedule required to handle the variance in the expected workload during the day; and producing a second workforce schedule that modifies the length of at least one of the plurality of shifts to accommodate the modification to the first workforce schedule.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIG. 3A is a block diagram showing one representation of an overtime (OT) template from FIG. 2.

FIG. 3B is a block diagram showing one representation of a voluntary time-off (VTO) template from FIG. 2.

DETAILED DESCRIPTION

Figure 1:
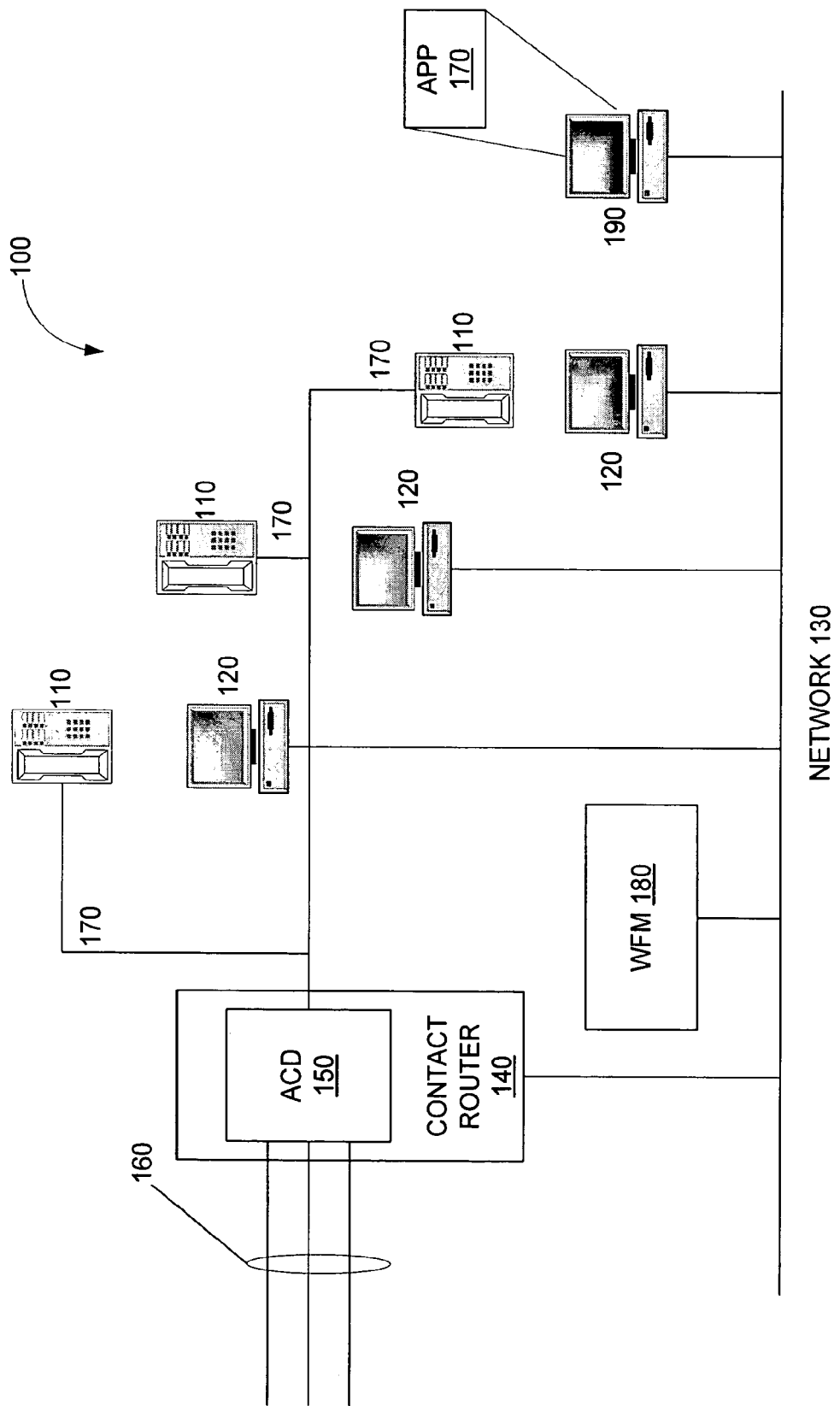
FIG. 1 is a block diagram of a representative contact center environment, in which an embodiment of a system and/or method for automatic scheduling of a workforce can be implemented.

FIG. 1 is a block diagram of a contact center environment 100. contact center 100 is staffed by agents who handle incoming and/or outgoing contacts. Although the traditional and most common form of contact is by phone, other types of contacts can be used, such as text chat, web collaboration, email, and fax. An agent workspace includes an agent phone 110 and a workstation computer 120. A network 130 connects one or more of the workstations 120.

A contact router 140 distributes or routes contacts (incoming or outgoing) to an agent position. Voice over Internet Protocol (VoIP) calls and computer-based contacts (e.g., chat, email) are routed over one or more data networks, and distributed over network 130 to one of the agent workstations 120. Contact router 140 may include an automatic call distributor (ACD) 150 to route phone contacts. The embodiments described herein will refer to ACD 150 instead of contact router 140, but analogous contact router actions and operations are intended to be captured by this disclosure. Note that a predictive dialer (not shown) could be used for directing outbound calls to agents for handling.

If an agent is not available to handle a particular call, ACD 150 puts the call into a queue, which effectively places the caller on hold. When an agent is available, ACD 150 connects the outside trunk line 160 carrying the phone call to one of the agents. More specifically, ACD 150 connects the outside trunk line 160 to the trunk line 170 of the selected agent.

When an agent is ready to handle contacts, the agent first logs into ACD 150. This login notifies ACD 150 that the agent is available to take calls. An agent's ACD state changes throughout the workday, as the agent performs work activities such as handling calls, performing after-call work, and taking breaks. An example list of states includes available, busy, after-call work, and unavailable.

While handling a contact, the agent interacts with one or more applications running on workstation 120. By way of example, workstation applications could provide the agent with access to customer records, product information, ordering status, and transaction history. The applications may access one or more business databases (not shown) via the network 130.

Call center 100 also includes a work force management system (WFMS) 180. WFMS 180 performs many functions. One such function is providing a contact center supervisor or manager with information about agents and contacts, both historical and real-time. Another function is supplying the supervisor with information on how well each agent complies with contact center policies. Yet another function is calculating staffing levels and creating agent schedules based on historical patterns of incoming contacts. The functionality of the entire work force management system (WFMS) 180 is typically divided among several applications, some of which have a user interface component, and WFMS 180 comprises the suite of applications.

In the environment described above, the workers assigned to shifts are contact center agents. However, the scheduling methods and systems described herein are also applicable to scheduling other kinds of workers in other types of work environments. Therefore, the remaining embodiments will refer to workers rather than agents.

Figure 2:
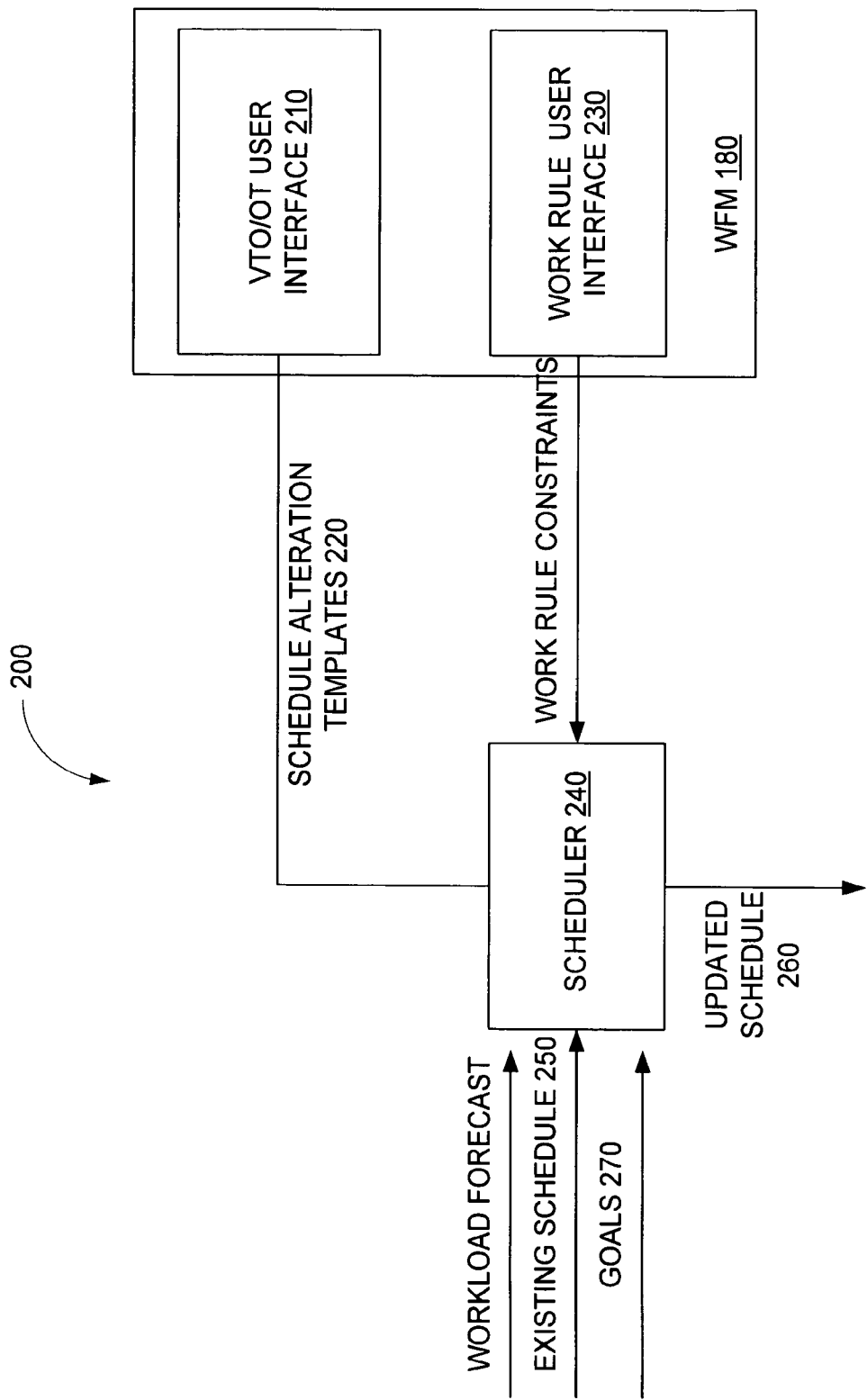
FIG. 2 is a dataflow diagram showing one embodiment of a system for automatic scheduling of a workforce.

FIG. 2 is a dataflow diagram showing one embodiment of a system (200) for automatic scheduling of a workforce. A user interacts with a template user interface component 210 of WFMS 180 to define one or more schedule alteration templates 220. These schedule alteration templates 220 define ways in which a schedule can be altered. A user also interacts with a work-rule user interface component 230 to define work rules such as maximum shift length, shift start times, and break requirements. Although shown as two separate components in FIG. 2, in another embodiment the template user interface 210 and work-rule interface 230 are combined into a single user interface.

Two different types of templates can be created in the embodiment in FIG. 2. Voluntary time-off (VTO) templates 220V describe an alteration that truncates an already-scheduled shift and adds a new time-off activity located adjacent to that shift. Overtime (OT) templates 220O describe an alteration that extends an already-scheduled shift to include a new work activity, where the extension may allow a gap between the original shift and the overtime.

Schedule alteration templates 220 are provided as input to a scheduler component 240, along with an existing schedule 250. Scheduler 260 produces an updated schedule 270 that attempts to optimize goals 280 while meeting a workload forecast 290 and a set of work-rule constraints 2100.

FIG. 3A is a block diagram showing one representation of an overtime (OT) template 220O. An OT template 220O is one type of schedule alteration template 220, through which a user defines ways in which a workday shift can be altered. OT template 220O includes the following attributes: an activity 310; a duration 320; an action 330; a placement 340; and a gap 350. Activity 310 represents the expected work activity to be performed during the overtime. Typical examples include phone, email, and fax, but this field can be any work activity. Duration 320 represents the duration of the overtime shift. In one embodiment, duration 320 is a range, indicating a minimum and a maximum value for the duration. For overtime, action 330 is set to Extend, since overtime extends an existing shift. Placement 340 refers to where the overtime is placed on the schedule relative to the existing shift: BeginnningOfShift, EndOfShift, or Either. Finally, gap 350 allows time between the existing shift and the overtime. A special value, such as zero, indicates that the overtime occurs next to the existing shift, with no gap. In one embodiment, gap 350 is a range, indicating a minimum and a maximum value for the gap.

FIG. 3B is a block diagram showing one representation of a voluntary time-off (VTO) template 220V. VTO template 220V is another type of schedule alteration template 220, through which a user defines ways in which a workday shift can be altered. VTO template 220V includes an activity 360; a duration 370; an action 380; and a placement 390. Activity 360 is set to VoluntaryTimeOff since the worker is not performing a work activity. Duration 370 represents the duration of the time off. In one embodiment, duration 370 is a range, indicating a minimum and a maximum value for the duration. Action 380 is set to Truncate, since time-off truncates an existing shift. Placement 390 refers to where the time-off activity is placed relative to the existing shift: BeginnningOfShift, EndOfShift, or Either.

Figure 4:
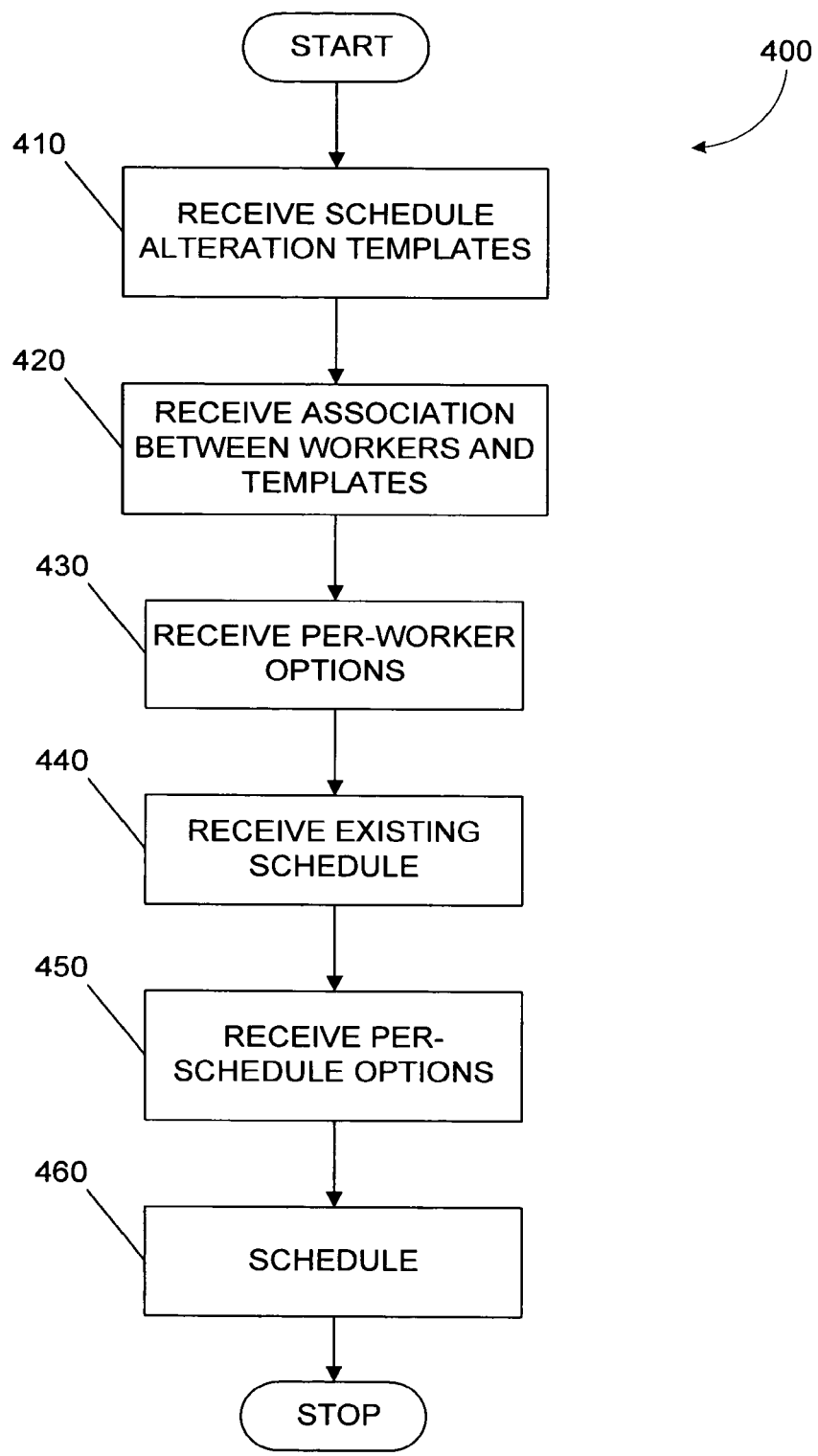
FIG. 4 is a flowchart for one embodiment of a method for automatic scheduling of a workforce.

FIG. 4 is a flowchart for one embodiment of a method (400) for automatic scheduling of a workforce. At block 410, one or more schedule alteration templates (220) are received. Next (block 420), an association between workers and templates 220 is received. At block 430, worker-specific VTO/OT scheduling options are received. In one embodiment, these worker-specific scheduling options include: maximum OT/VTO per day and/or per week; OT Before/After Shift preferences (e.g., Prefer, Don't Want, Any); and VTO Start Of/End Of Shift preferences (e.g. Prefer, Don't Want, Any). Block 430 is optional, but if present is repeated for each worker that is associated with a schedule alteration template 220.

Processing then continues at block 440, where a selection of an existing schedule 250 is received. Next (block 450), options specific to the selected schedule are received. In one embodiment, these schedule-specific options include: maximum OT/VTO per day and/or per week; Add OT Placement (Before/After shift); and Add VTO Placement (Start Of/End Of shift). Block 450 is optional. At block 460, an updated schedule 270 is produced based on the received templates 220 and options (if present). Updated schedule 270 is produced in accordance with constraints 2100 and goals 280. As will be described in further detail in connection with FIGS. 5, 6, and 7A-D, updated schedule 270 is calculated by generating schedulable objects (FIG. 5) and then applying the objects to existing schedule 250.

Figure 5:
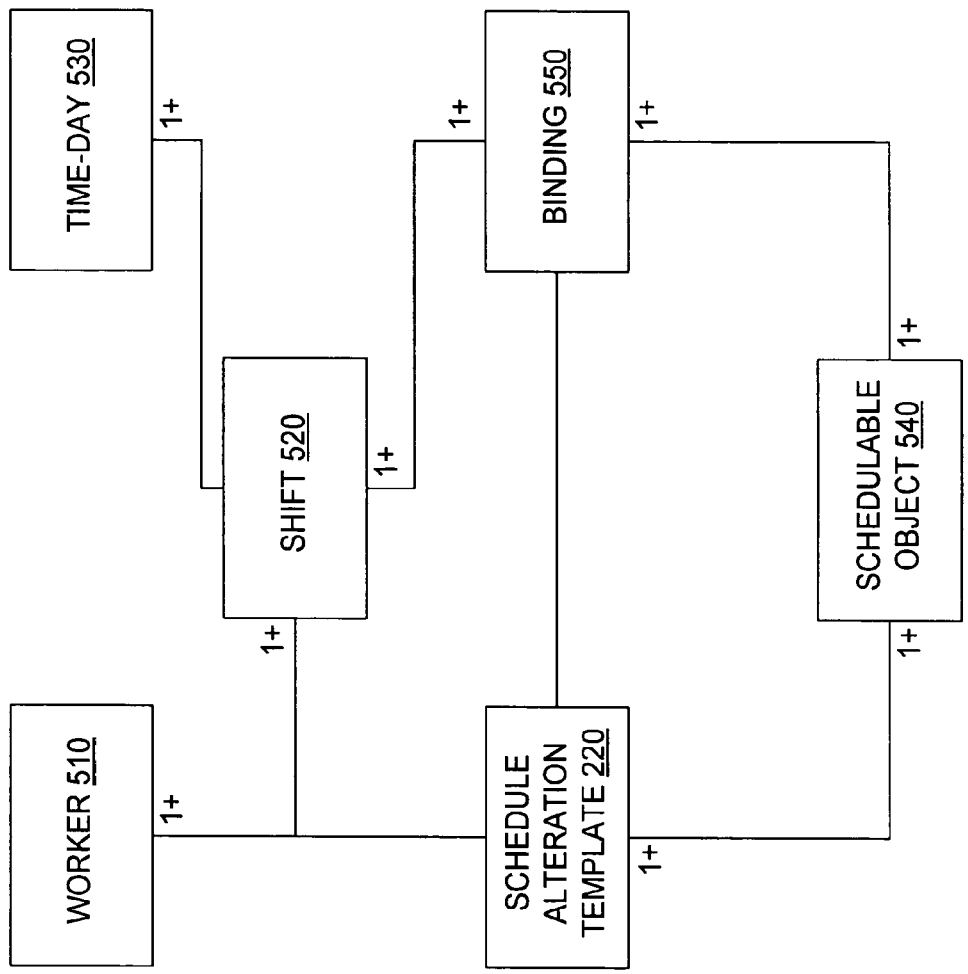
FIG. 5 shows a set of entities, and the interrelationships between them, used by one embodiment of a scheduler that includes automatic scheduling of a workforce.

FIG. 5 shows a set of entities, and the interrelationships between them, used by one embodiment of a scheduler 260 that supports automatic scheduling of a workforce. Schedule alteration templates 220 were discussed earlier in connection with FIG. 3. As stated earlier, each schedule alteration template 220 is associated with one or more workers 510. Each worker 510 is also associated with a shift 520, where a shift 520 is described by a time range and a day (530). As can be seen in FIG. 5, worker 510 can have more than one shift 520, and a time range-day 530 can be associated with more than one shift 520 (e.g., different workers). However, a particular shift 520 is specific to worker and to a time range-day (e.g. a shift representing "John Doe on Monday 9 AM-5 PM.").

A schedule alteration template 220 describes possible alterations to any already-scheduled shift 520, but is not associated with any particular shift 520. Scheduler 260 creates one or more schedulable objects 540 based on each schedule alteration template 220, such that attributes in a schedulable object 540 are initialized from corresponding attributes in the template 220. Each schedulable object 540 is associated with a shift 520, and represents a possible change in the schedule adjacent to that shift 520.

Scheduler 260 also creates a set, or domain, of bindings 550 for each shift 520. A binding represents a time slot in, or adjacent to, an employee shift. As can be seen in FIG. 5, a schedulable object 540 can possibly be bound to more than one binding 550. Scheduler 260 chooses one optimal binding 550 for each schedulable object 540. By selecting a binding for a schedulable object, scheduler 260, in effect, assigns the work activity for that one object (derived from a template) to the time slot specified in the binding. The process of creating schedulable objects 540, creating bindings 550, and choosing optimal bindings 550 will now be discussed in connection with FIGS. 6 and 7.

Figure 6:
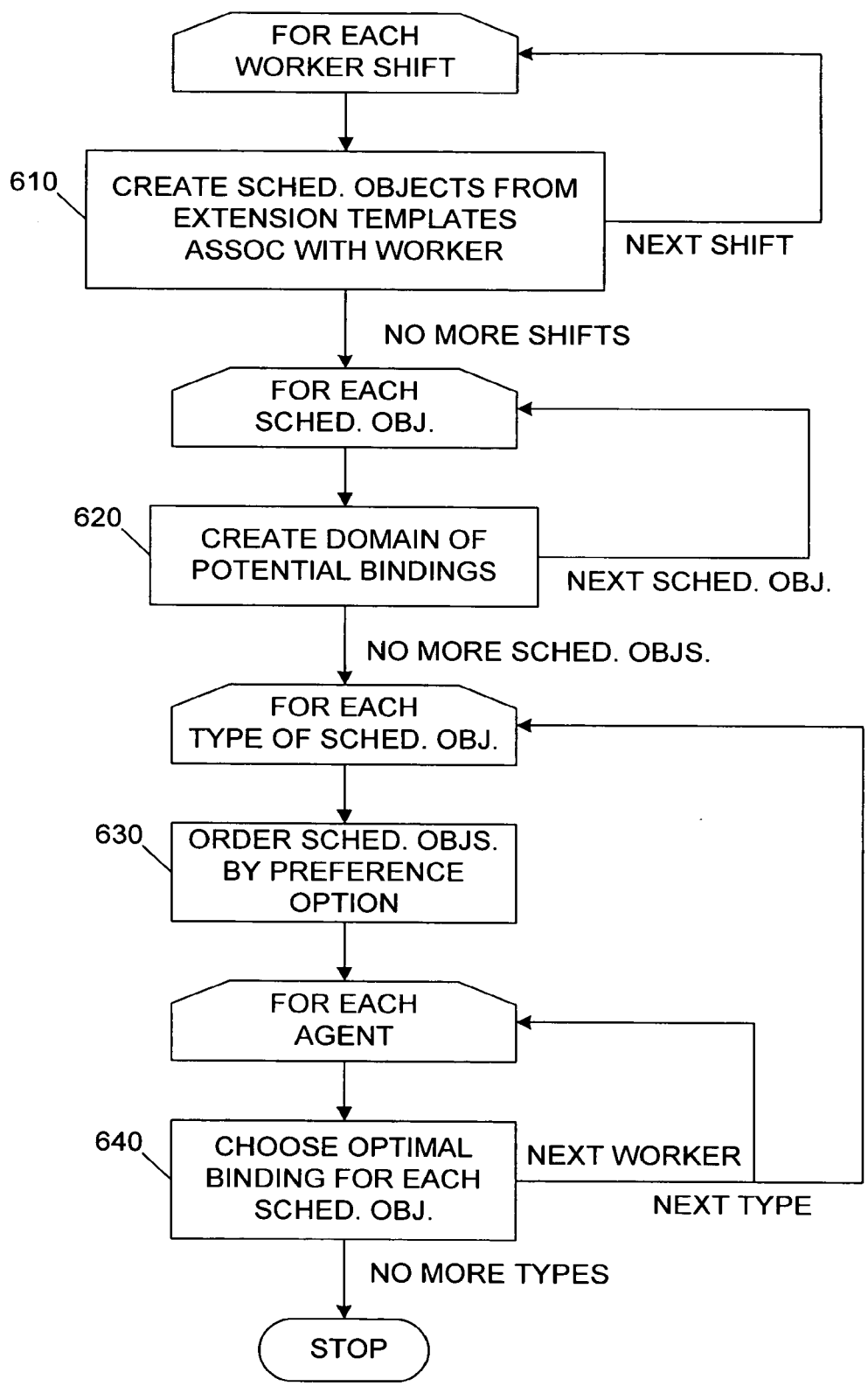
FIG. 6 is a flowchart for one embodiment of a scheduler that includes automatic scheduling of a workforce.

FIG. 6 is a flowchart for one embodiment of scheduler 260 that supports automatic scheduling of a workforce. At block 610, schedulable objects are created from schedule alteration templates 220. The creation of schedulable objects from schedule alteration templates 220 and an existing schedule 250 can be seen in the example scenario illustrated in FIG. 7. In this example scenario, existing schedule 250 is composed of multiple worker shifts 520: John's Monday shift from 9 AM to 5 PM (shift 520A); John's Tuesday shift from 10 AM to 6 PM (shift 520B); and Fred's Tuesday shift from 11 AM to 7 PM (shift 520C). John is associated with three schedule alteration templates 220: overtime before (template 220OB); voluntary time-off before (template 220VB); and voluntary time-off after (template 220VA). Fred is associated with the two "after" templates, template 220OA and template 220VA.

For templates 220 with a placement value of either "BeginningOfShift" or "EndOfShift", scheduler 260 creates a set of schedulable objects 540 associated with those templates. (As the name suggests, these values specify where the object is scheduled in relation to the shift; see the discussion of FIG. 3 for more discussion of these placement values.) Specifically, one object 540 is created for each worker shift associated with the template 220. In the example scenario of FIG. 7, template 220OB is associated with two shifts (John M9-5 and John T10-6), so two objects (540A and 540B) are created from template 220OB. In this example, the template-shift association is indirect, through a template-worker relationship and a worker-shift relationship; however, another embodiment using a direct association between template and shift is contemplated. One of ordinary skill in the art should understand by viewing FIG. 7 how the remaining objects 540C-G are created from the other two templates in a similar manner.

If the template 220 has a placement value of "Either", then the above process is repeated to create two such sets of objects. One of the sets gets a placement value of "BeginningOfShift" and the other corresponding set gets a placement value of "EndOfShift". In the simple example scenario of FIG. 7, none of the three templates (220OB, 220VB, 220VA) has a placement value of "Either".

Returning to the flowchart in FIG. 6, after schedulable objects are created in block 610, processing continues at block 620, where a set, or domain, of potential bindings is created for schedulable objects 540, based on attributes such as start time, end time, gap, and duration. Values for these schedulable object attributes are derived from corresponding attributes in template 220. Creation of bindings 550 will now be discussed in connection with FIG. 7.

A schedulable object 540 is associated with a worker shift 520, which has a start time and an end time. Bindings 550 also have a start time and an end time. Bindings 550 are created for a particular shift 520, starting with the time slot adjacent to the shift start or end (depending on whether the Action attribute in object 540 is "Beginning" or "End"). The number of bindings 550 depends on the Duration attribute in the object 540: enough bindings are created to span the time specified by the Duration attribute. However, these bindings 550 are also constrained by work-rules, which may limit the start or end time of a shift (e.g., a particular shift cannot starts before 6 AM or end after 9 PM).

In the example of FIG. 7, the object 540A ("John M9-5 OT Before") has a Duration of 2 hours, and is associated with shift 520M. Therefore, three bindings 710 are created: 710A is a one-hour slot from 8-9 AM; 710B is a one-hour slot from 7-8 AM; and 710C is a single two-hour slot from 7-9 AM. In addition, a "no time" binding is created (710D), representing the possibility that no object will be scheduled in this slot. The time slot granularity chosen in FIG. 7 is merely an example, and the time slot granularity of the bindings can be a larger or a smaller value.

Viewing FIG. 7, one of ordinary skill in the art should understand how bindings for remaining objects 540B-G are created in a similar manner: binding 720A-D for object 540B ("John T10-6 OT Begin"); binding 730A-B for object 540C ("John M9-5 VTO Begin"); binding 740A-B for object 540D ("John T10-6 VTO Begin"); binding 750A-B for object 540E ("John M9-5 VTO End"); binding 760A-B for object 540F ("John T10-6 VTO End"); and binding 770A-D for object 540G ("Fred T11-7 VTO End").

In this example, the domain of bindings for a schedulable object includes at least one binding with a time slot adjacent to the shift, because the Gap field in each object is zero. (The Gap field in a schedulable object is set from the template.) In contrast, the bindings created for objects that have a non-zero Gap field do not include a time slot adjacent to the shift. Instead, the closest time slot is separated from the shift by the value specified by Gap. In this example, the Gaps are fixed values, but in other embodiments Gap is a range, which results in the creation of additional bindings.

Returning to the flowchart in FIG. 6, after schedulable objects are created in block 610, processing continues at block 630, where OT objects are ordered according to worker-specific scheduling preferences. As described earlier in connection with FIG. 5, scheduler 260 receives OT and VTO preferences (e.g., Prefer, Don't Want, Any) set by workers. Thus, schedulable objects 540 associated with workers that prefer OT are first, and schedulable objects 540 associated with workers that do not want OT are last, with schedulable objects 540 associated with workers with no preference in the middle.

Next, at block 640, the optimal binding for each OT object is selected. The techniques that schedulers use to produce an optimal schedule for a given set of inputs (workload, constraints, and goals) should be understood by a person of ordinary skill in the art. Such techniques include, but are not limited to, local search, simulated annealing, and heuristics. The use of schedulable objects and bindings should also be understood by such a person.

Since the previous step 630 was ordered by worker, the effect is to choose bindings for all the OT objects of the same type (Begin or End) for one worker before moving to the next worker. When bindings for all objects have been chosen, the ordering and selection blocks 630 and 640 are repeated for VTO objects. This process can be extended to support schedulable objects of other types as well.

Figure 7A:
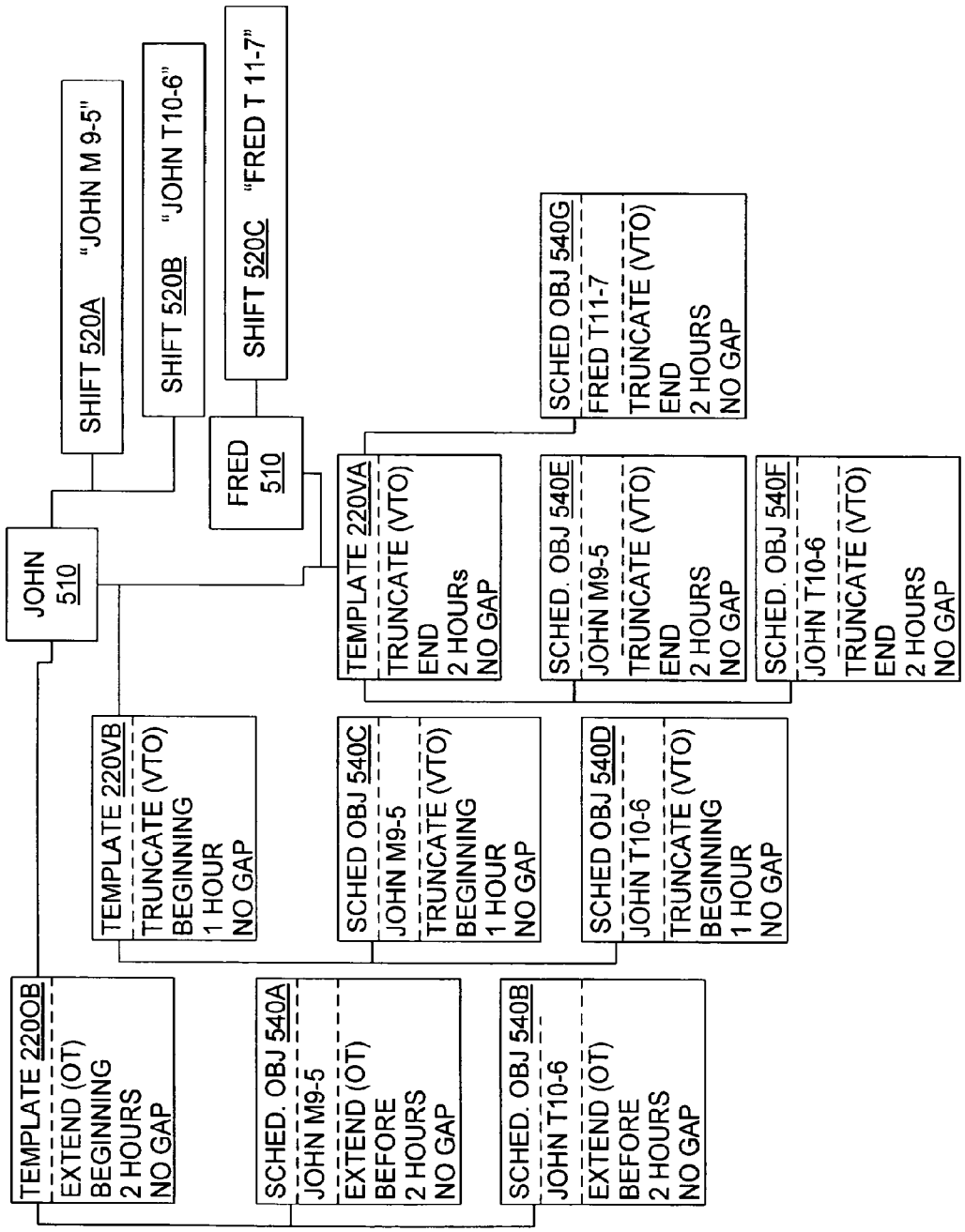
FIG. 7A-7D illustrate an example scenario in which a scheduler automatically schedules overtime and time-off for a workforce.
Figure 7B:
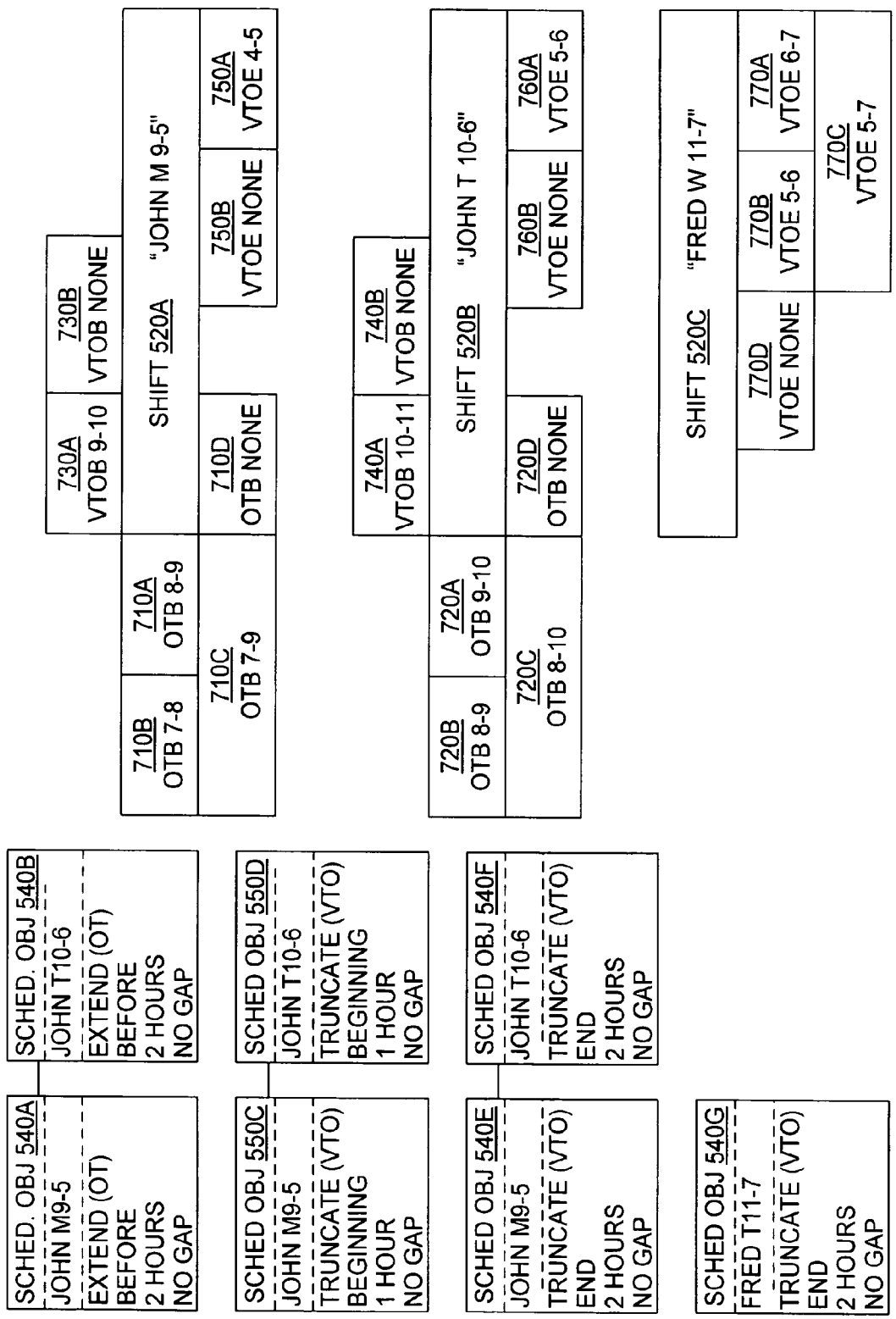
Figure 7C:
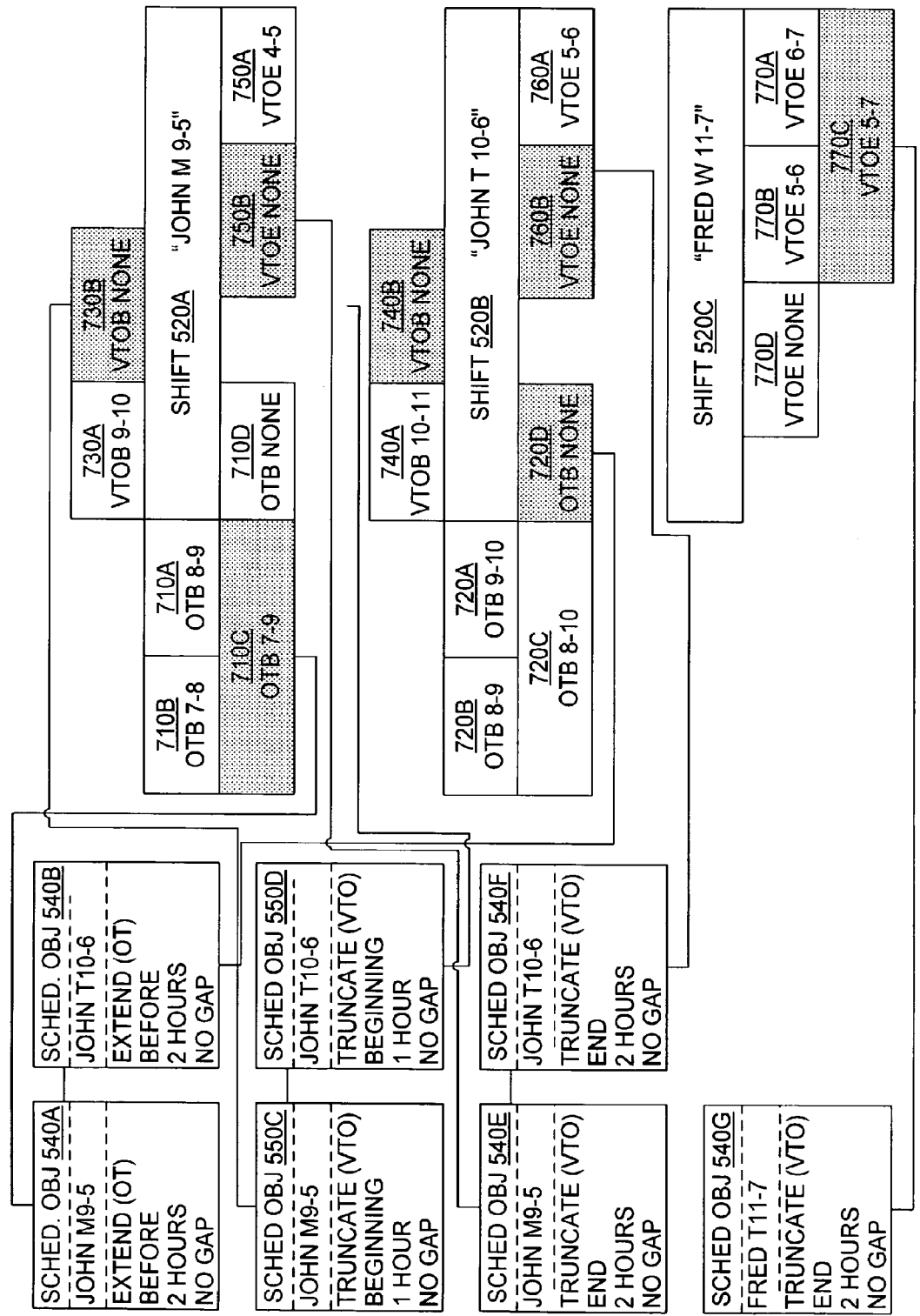

FIG. 7C shows the bindings chosen by the scheduler 260 for schedulable objects 540A-I, in one example scenario. In this diagram, bindings selected by scheduler 260 are shaded, while those not selected are not shaded. As can be seen in FIG. 7C, several objects are bound to a "none" slot: object 540B ("John T10-6 OT Begin"); object 540H ("John M9-5 VTO Begin"); object 540I ("John M9-5 VTO End"); object 540J ("John T10-6 VTO Begin"); and object 540K ("John T10-6

VTO End"). Object 540A ("John M9-5 OT Before") is bound to the two-hour slot representing 7-9 (710C). Object 540G ("Fred T11-7 VTO After") is bound to the two-hour slot representing 5-7 (770C).

Figure 7D:
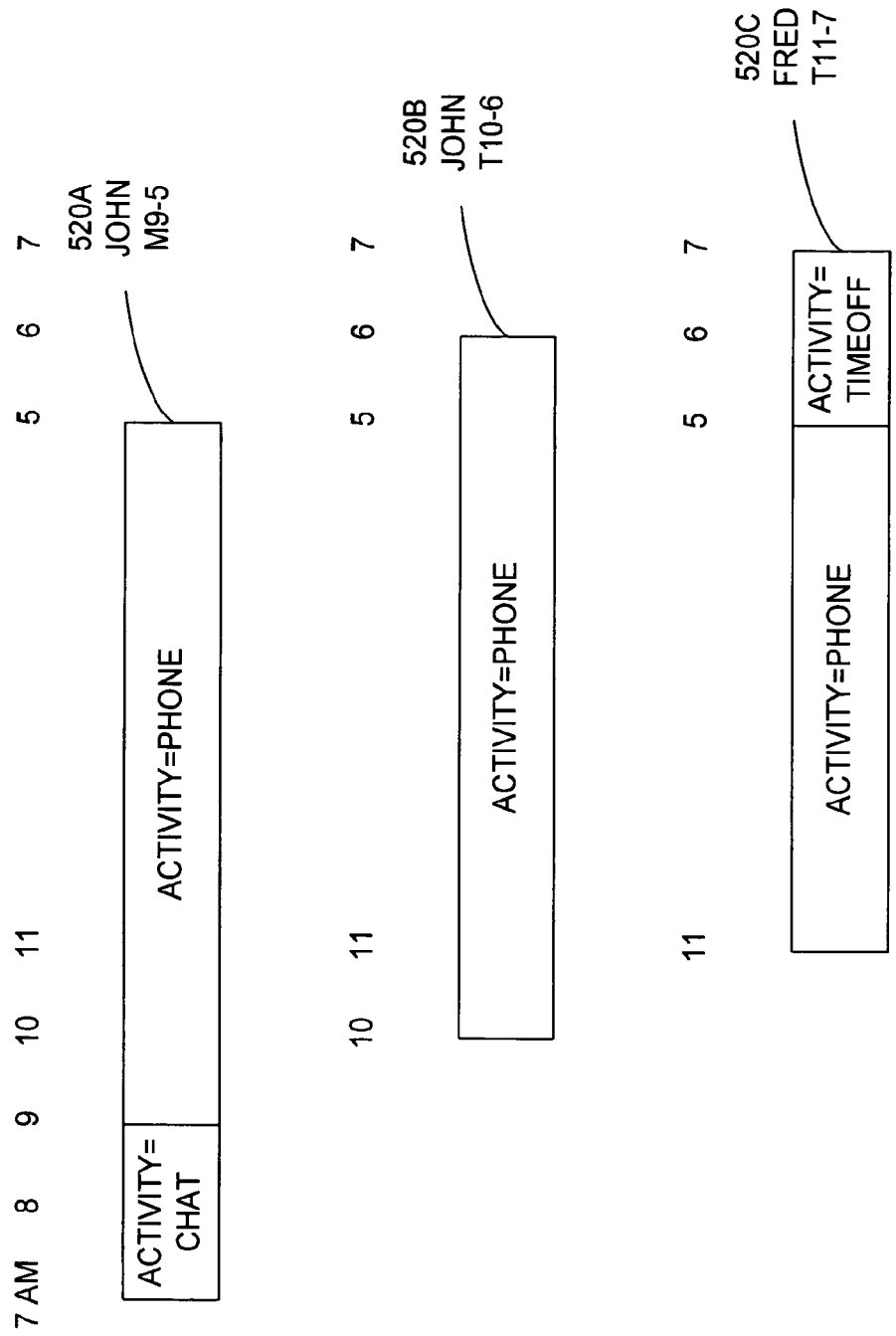

FIG. 7D shows an updated schedule 270 resulting from the selected bindings shown in FIG. 7C. Shift 520A ("John M 9-5") has been modified to include a new work activity from 7 AM to 9 AM. This is a result of the binding representing 7-9 AM (binding 710C) being selected for object 540A ("John M9-5 OT Before"). The bindings selected for the other objects for shift 520A (540L and 540M) were all "none", meaning schedulable objects 540N and 540O did not affect shift 520A. All bindings selected for shift 520B ("John T10-6") object were "none", meaning shift 520B remains unchanged. Shift 520C ("Fred T11-7") has been modified to include a new time-off activity from 5 PM to 7 PM. This is a result of binding representing 5-7 PM (binding 770C) being selected for object 540G ("Fred T11-7 VTO After").

Figure 8:
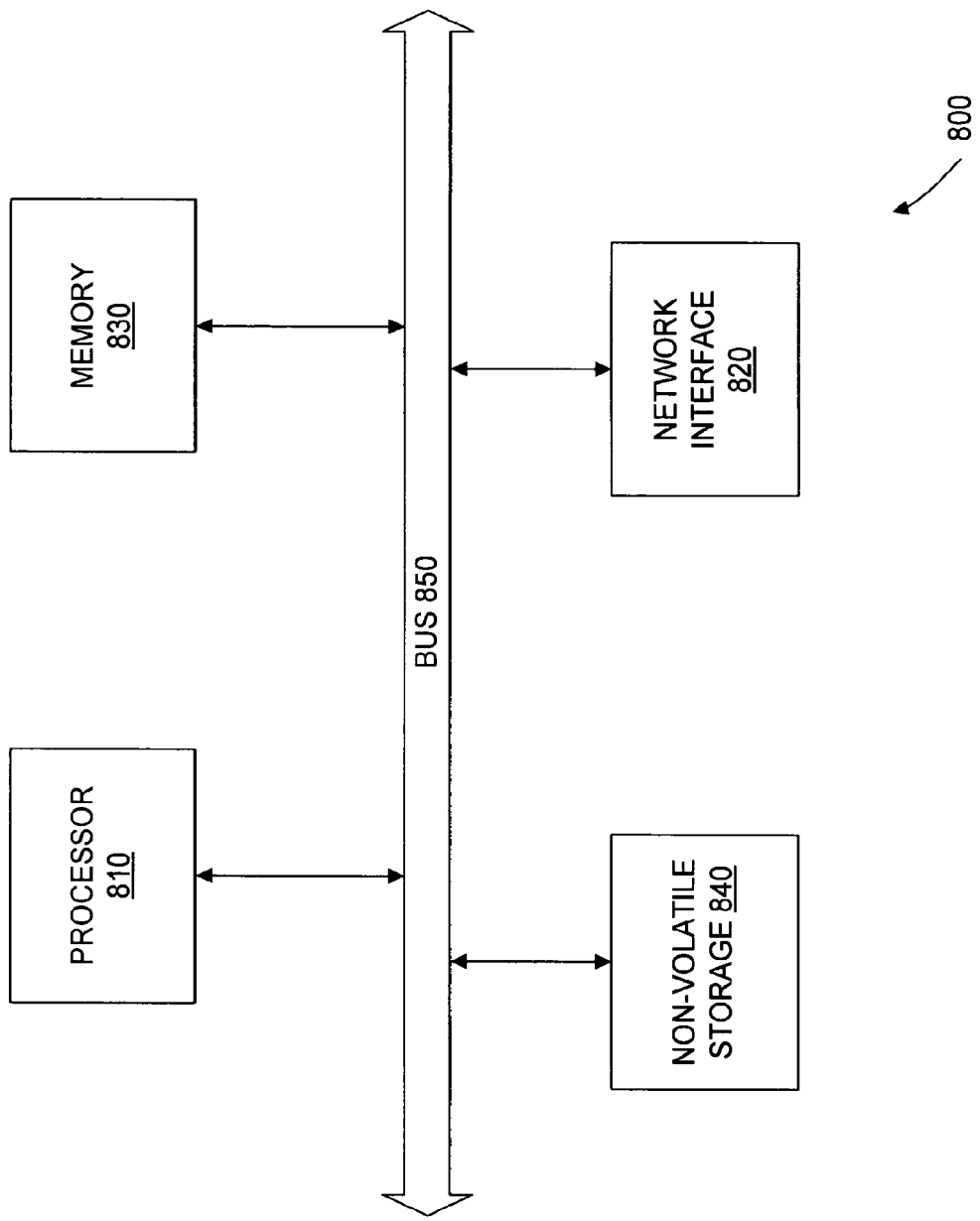
FIG. 8 is a hardware block diagram of a general-purpose computer which can be used to implement systems and methods for automatic scheduling of a workforce.

FIG. 8 is a hardware block diagram of a general-purpose computer 800 which can be used to implement various embodiments of systems and methods for automatic scheduling of a workforce. Computer 800 contains a number of components that are well known in the art of contact center software, including a processor 810, a network interface 820, memory 830, and non-volatile storage 840. Examples of non-volatile storage include, for example, a hard disk, flash RAM, flash ROM, and EEPROM. These components are coupled via a bus 850. Memory 830 contains instructions which, when executed by the processor 810, implement systems and methods for automatic scheduling of a workforce, such as the processes depicted in the diagrams of FIGS. 4, 5, 6, and 7A-D. Omitted from FIG. 8 are a number of conventional components that are unnecessary to explain the operation of computer 800.

The systems and methods for automatic scheduling of a workforce can be implemented in software, hardware, or a combination thereof. In some embodiments, the system and/or method is implemented in software that is stored in a memory and that is executed by a suitable microprocessor (μP) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology includes (but are not limited to): an optical fiber; and a portable compact disk read-only memory (CD-ROM). In addition, the functionality could be implemented in logic embodied in hardware or software-configured media.

Any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

What we claim is:

1. A method of workforce scheduling to handle an expected workload, the method comprising:
   in an instruction execution system, receiving a first workforce schedule describing existing assignments of a plurality of workers to a plurality of shifts, each of the shifts being associated with a time range and a day;
   in response to a variance in the expected workload, selecting a modification to the first workforce schedule required to handle the variance in the expected workload during the day; and
   in the instruction execution system, identifying a time period during the day during which to accommodate the modification for a worker of the plurality of workers based at least in part on the worker-specific scheduling preferences that are associated with the worker, wherein the worker-specific scheduling preferences that are associated with the worker comprise overtime placement preferences and voluntary time-off placement preferences of the worker; and
   producing, by the instruction execution system, a second workforce schedule that modifies the length of at least one of the plurality of shifts that is associated with the worker to accommodate the modification to the first workforce schedule during the identified time period.

2. The method of claim 1 further comprising determining a plurality of possible modifications to the first workforce schedule available to handle the variance in the expected workload.

3. The method of claim 2 wherein selecting the modification to the first workforce schedule required to handle the variance in the expected workload comprises selecting the modification from the plurality of possible modifications.

4. The method of claim 3 wherein the variance in the expected workload comprises an increase in the expected workload during the day.

5. The method of claim 4 wherein the modification comprises a period of overtime for the worker during the day.

6. The method of claim 3 wherein the variance in the expected workload comprises a decrease in the expected workload during the day.

7. The method of claim 6 wherein the modification comprises a period of time-off for the worker during the day.

8. A system for workforce scheduling to handle an expected workload, comprising:
- an interface that receives a first workforce schedule describing existing assignments of a plurality of workers to a plurality of shifts, each of the shifts being associated with a time range and a day;
- a processor coupled to the interface that, in response to a variance in the expected workload, selects a modification to the first workforce schedule required to handle the variance in the expected workload during the day, identifies a time period during the day during which to accommodate the modification for a worker of the plurality of workers based at least in part on the worker-specific scheduling preferences that are associated with the worker, wherein the worker-specific scheduling preferences that are associated with the worker comprise overtime placement preferences and voluntary time-off placement preferences of the worker, and produces a second workforce schedule that modifies the length of one of the plurality of shifts that is associated with the worker to accommodate the modification to the first workforce schedule during the identified time period.

9. The system of claim 8 wherein the processor further determines a plurality of possible modifications to the first workforce schedule available to handle the variance in the expected workload.

10. The system of claim 9 wherein, to select the modification to the first workforce schedule required to handle the variance in the expected workload, the processor selects the modification from the plurality of possible modifications.

11. The system of claim 10 wherein the variance in the expected workload comprises an increase in the expected workload during the day.

12. The system of claim 11 wherein the modification comprises a period of overtime for the worker during the day.

13. The system of claim 10 wherein the variance in the expected workload comprises a decrease in the expected workload during the day.

14. The system of claim 13 wherein the modification comprises a period of time-off for the worker during the day.

15. A non-transitory computer readable medium having program instructions stored thereon that, when executed by a computer system, direct the computer system to:
- receive a first workforce schedule describing existing assignments of a plurality of workers to a plurality of shifts, each of the shifts being associated with a time range and a day, and to receive worker-specific scheduling preferences associated with the plurality of workers; and
- in response to a detected variance in an expected workload, select either an overtime modification to the first workforce schedule or a time-off modification to the first workforce schedule to handle the variance in the expected workload during the day, identify a time period during the day during which to accommodate either the overtime modification or the time-off modification for a worker of the plurality of workers based on the worker-specific scheduling preferences that are associated with the worker, wherein the worker-specific scheduling preferences that are associated with the worker comprise overtime placement preferences and voluntary time-off placement preferences of the worker, and produce a second workforce schedule that modifies the length of one of the plurality of shifts that is associated with the worker to accommodate either the overtime modification or the time-off modification to the first workforce schedule during the identified time period.

16. The non-transitory computer readable medium of claim 15 wherein the program instructions further direct the computer system to determine a plurality of possible modifications to the first workforce schedule available to handle the detected variance in the expected workload.

17. The non-transitory computer readable medium of claim 16 wherein, to select the modification to the first workforce schedule required to handle the detected variance in the expected workload, the program instructions direct the computer system to select either the overtime modification or the time-off modification from the plurality of possible modifications.

18. The non-transitory computer readable medium of claim 15 wherein the detected variance in the expected workload comprises an increase in the expected workload during the day.

19. The non-transitory computer readable medium of claim 15 wherein the detected variance in the expected workload comprises a decrease in the expected workload during the day.

20. The non-transitory computer readable medium of claim 15 wherein the worker-specific scheduling preferences that are associated with the worker comprise maximum overtime per day and maximum voluntary time-off per day.

* * * * *